(12) United States Patent
Wang et al.

(10) Patent No.: US 7,967,263 B2
(45) Date of Patent: Jun. 28, 2011

(54) FIXING DEVICE

(75) Inventors: Keng Ping Wang, Taipei (TW); Chin Chang Meng, Taipei (TW); Chih-Ching Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 12/426,157

(22) Filed: Apr. 17, 2009

(65) Prior Publication Data

US 2010/0072335 A1 Mar. 25, 2010

(30) Foreign Application Priority Data

Sep. 22, 2008 (TW) ................................ 97136298 A

(51) Int. Cl.
*A45D 42/14* (2006.01)

(52) U.S. Cl. .................. 248/205.5; 248/309.3; 248/363

(58) Field of Classification Search .................. 248/363, 248/362, 205.5, 205.7, 205.8, 205.9, 206.1, 248/206.2, 309.3

See application file for complete search history.

(56) References Cited

U.S. PATENT DOCUMENTS

| 7,021,593 | B1 * | 4/2006 | Fan | 248/206.2 |
| 7,516,926 | B2 * | 4/2009 | Liu | 248/205.5 |
| 7,661,638 | B2 * | 2/2010 | Yu | 248/205.8 |
| 2008/0111037 | A1 * | 5/2008 | Carnevali | 248/206.2 |
| 2010/0116954 | A1 * | 5/2010 | Fan | 248/205.8 |

FOREIGN PATENT DOCUMENTS

CN 101113751 A 1/2008

* cited by examiner

*Primary Examiner* — Ramon O Ramirez

(57) ABSTRACT

A fixing device is provided. The fixing device is fixed to a surface, comprising a sucker, a rack, a gear, a transforming unit and a limiting unit. The rack is connected to the sucker. The gear is engaged to the rack. The transforming unit is connected to the gear. The transforming unit rotates the gear to move the rack between a first position and a second position. The rack pushes the sucker to apply a suction force to the surface when the rack is in the first position, and the suction force of the sucker is released when the rack is in the second position. The limiting unit is connected to the rack to restrict the rack.

12 Claims, 11 Drawing Sheets

FIXING DEVICE

CROSS REFERENCE TO RELATED APPLICATIONS

This Application claims priority of Taiwan Patent Application No. 97136298, filed on Sep. 22, 2008, the entirety of which is incorporated by reference herein.

BACKGROUND OF THE INVENTION

1. Field of the Invention

The present invention relates to a fixing device, and in particular relates to a fixing device for fixing a portable electronic device on a surface.

2. Description of the Related Art

FIG. 1 shows a conventional fixing device 1 for fixing a portable electronic device on a surface 2. The fixing device 1 comprises a sucker 10 and a rotatable element 20. The rotatable element 20 is rotated to attach the sucker 10 to the surface 1 or to detach the sucker 10 from the surface 2.

Conventionally, the rotatable element 20 simply transforms a pull/push force applied to the sucker 10 into torque, which may be inefficient. If the finger of user does not apply sufficient force, the rotatable element 20 cannot be easily rotated to attach the sucker 10 to the surface 2 or detach the sucker 10 from the surface 2.

BRIEF SUMMARY OF THE INVENTION

A detailed description is given in the following embodiments with reference to the accompanying drawings.

A fixing device is provided. The fixing device is fixed to a surface, comprising a sucker, a rack, a gear, a transforming unit and a limiting unit. The rack is connected to the sucker. The gear is engaged to the rack. The transforming unit is connected to the gear. The transforming unit rotates the gear to move the rack between a first position and a second position. The rack pushes the sucker to apply a suction force to the surface when the rack is in the first position, and the suction force of the sucker is released when the rack is in the second position. The limiting unit is connected to the rack to restrict the rack.

Utilizing the embodiment of the invention, the user attaches the sucker to the surface gradually via pressing the push-button. Compared to conventional art, the action of attaching the sucker to the surface of the embodiment can be accomplished with decreased force.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
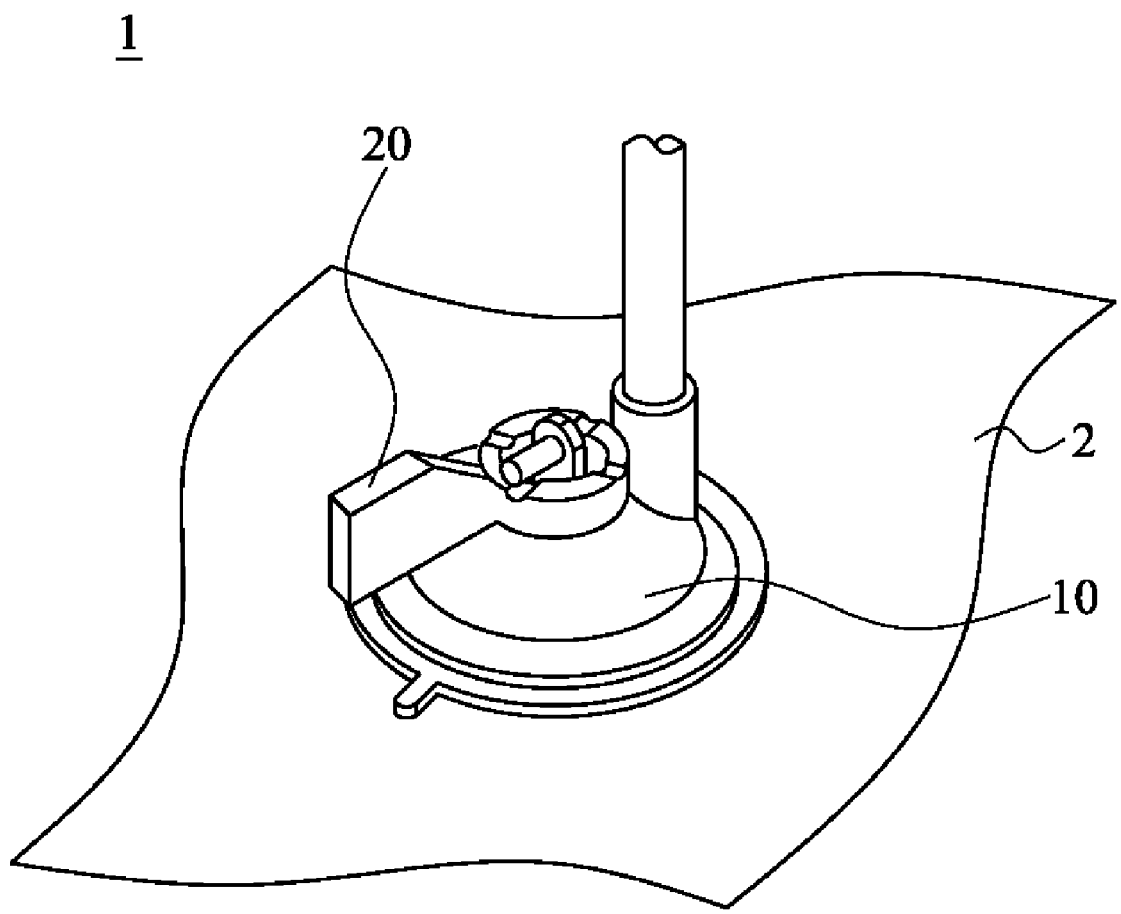
FIG. 1 shows a conventional fixing device for fixing a portable electronic device on a surface.
Figure 2:
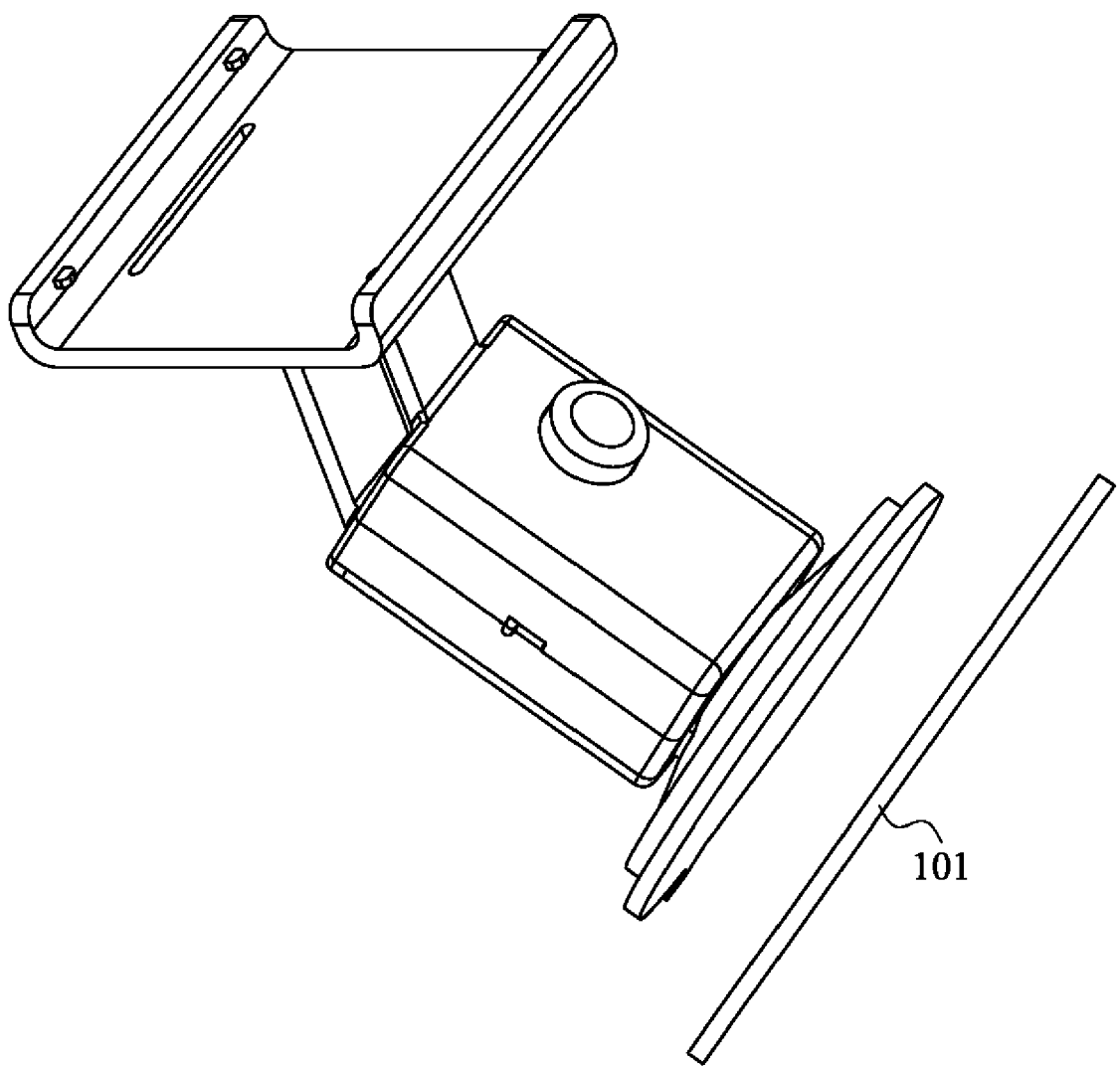
FIG. 2 shows a fixing device of an embodiment of the invention for fixing a portable electronic device on a surface.
Figure 3:
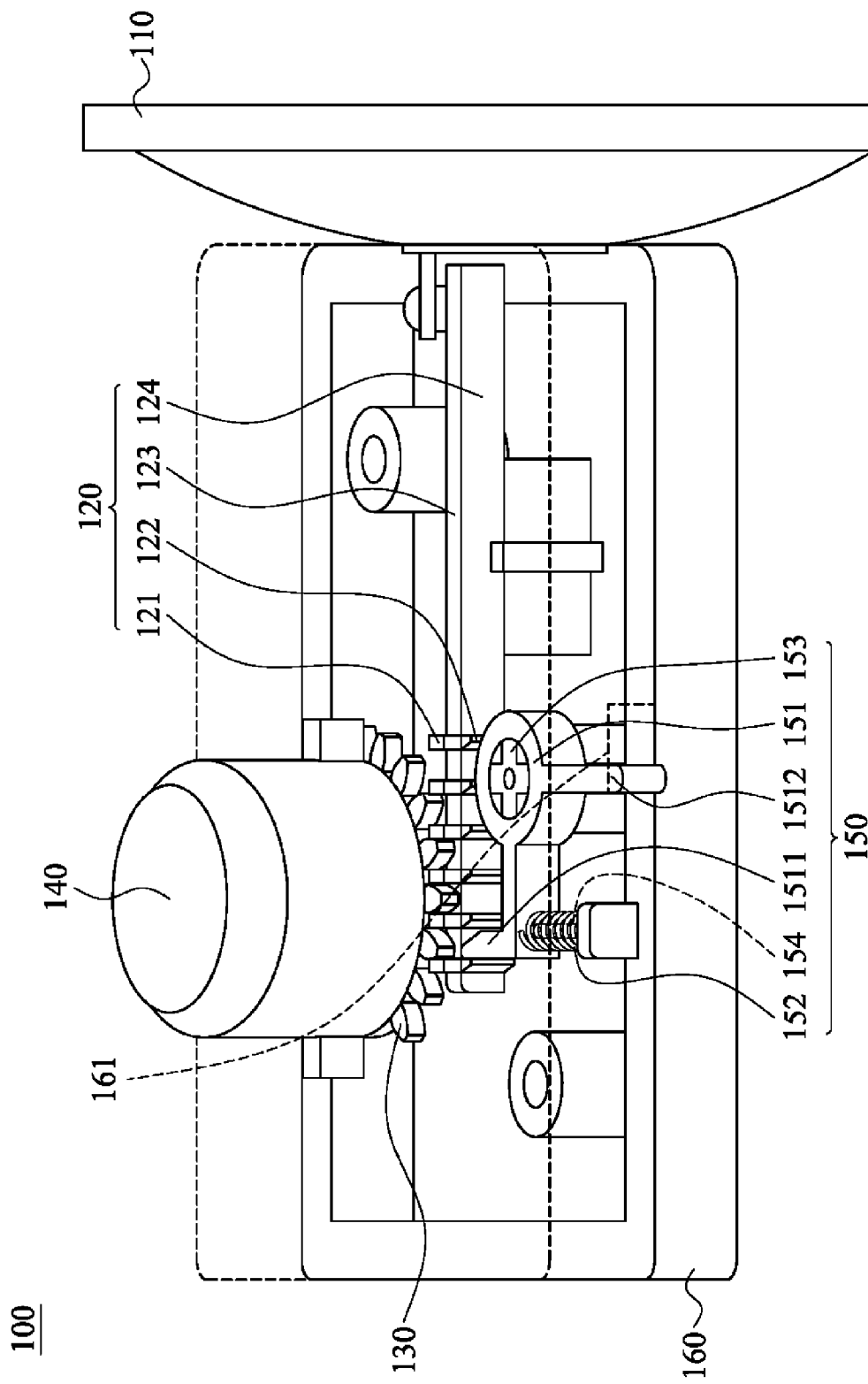
FIG. 3 shows an inner structure of the fixing device of the embodiment of the invention.

FIG. 2 shows a fixing device 100 of an embodiment of the invention for fixing a portable electronic device on a surface 101. FIG. 3 shows an inner structure of the fixing device of the embodiment of the invention 100. With reference to FIGS. 2 and 3, the fixing device 100 comprises a sucker 110, a rack 120, a gear 130, a transforming unit 140, a limiting unit 150 and a housing 160. The rack 120 is connected to the sucker 110. The gear 130 engages the rack 120. The transforming unit 140 is connected to the gear 130. The transforming unit 140 rotates the gear 130 to move the rack 120 between a first position and a second position. When the rack 120 is in the first position, the sucker 110 is attached to the surface. When the rack 120 is in a second position, the rack 120 is detached from the sucker 110. The limiting unit 150 is connected to the rack 120. The limiting unit 150 restricts the rack 120 in the first position, the second position or a stable position between the first and second positions. The rack 120, the gear 130 and the limiting unit 150 are disposed in the housing 160.

In FIG. 3, the upper portion of the housing is represented by a dotted line to clearly show the embodiment of the invention. The housing 160 comprises an opening 161. When the limiting unit 150 restricts the rack 120, the limiting unit 150 abuts an inner wall of the opening 161.

The rack 120 comprises a plurality of first teeth 121 and a plurality of second teeth 122. The first teeth 121 engages the gear 130. The second teeth 122 abuts the limiting unit 150. The rack 120 further comprises a first rack surface 123 and a second rack surface 124. The first rack surface 123 is perpendicular to the second rack surface 124. The first teeth 121 are formed on the first rack surface 123, and the second teeth 122 are formed on the second rack surface 124.

The limiting unit 150 comprises a limiting rod 151, an elastic element 152, a shaft 153 and a post 154. The limiting rod 151 comprises a first end 1511 and a second end 1512. The limiting rod 151 pivots on the shaft 153. The elastic element 152 is a compression spring telescoped on the post 154. The shaft 153 and the post 154 are disposed in the housing 160 and connected to the inner wall of the housing 160.

Figure 4:
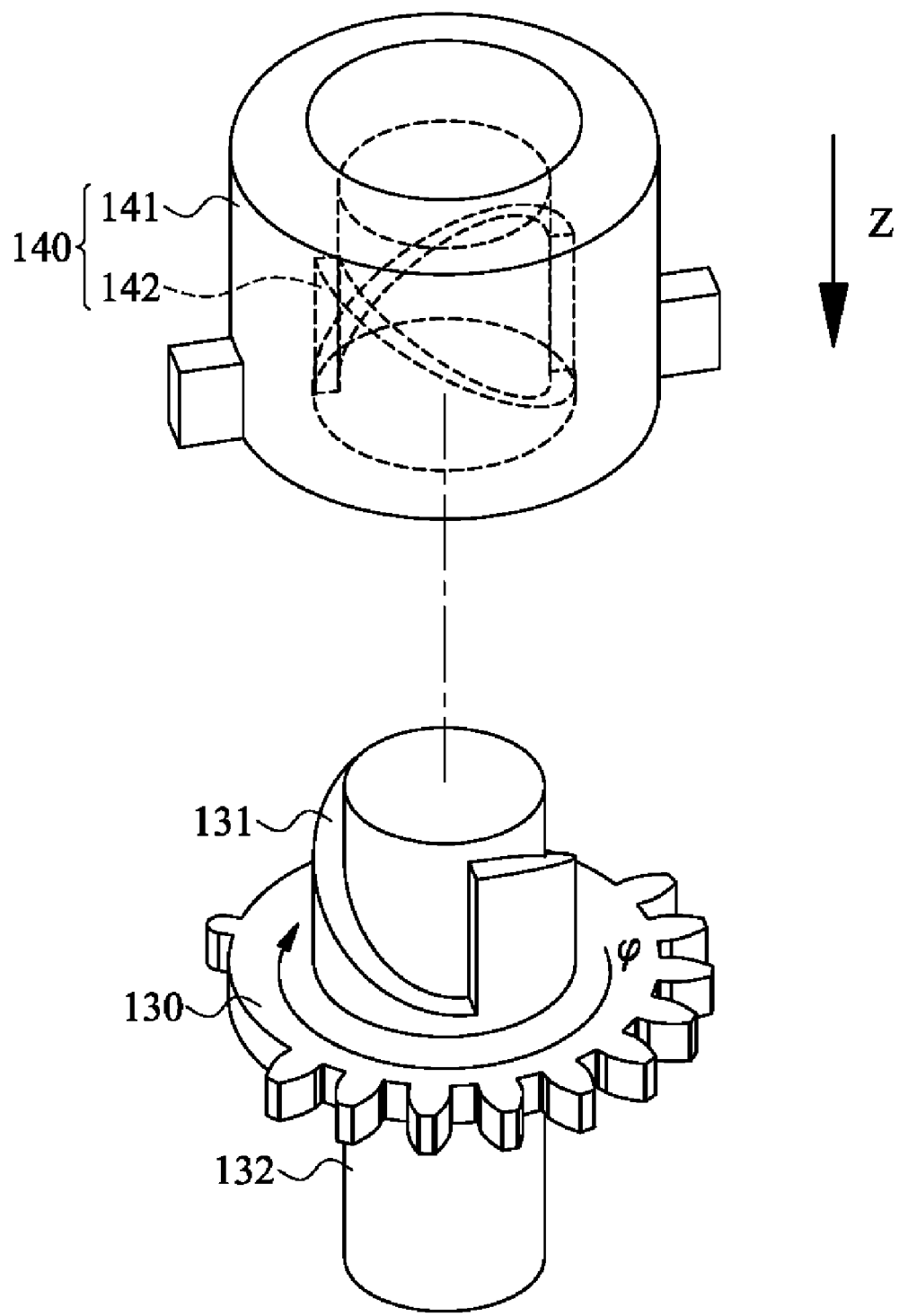
FIG. 4 shows the detailed structure of a transforming unit and a gear of the embodiment of the invention.

With reference to FIG. 4, the transforming unit 140 comprises a push-button 141 and a first tilt slideway 142. The gear 130 comprises a second tilt slideway 131. The first tilt slideway 142 is formed in the push-button 141. The second tilt slideway 131 is formed on the gear. The first tilt slideway 142 contacts the second slideway 131. The gear 130 is disposed on an axle 132. When the push-button 140 is pressed along a moving direction Z, the second tilt slideway 131 slides relative to the first tilt slideway 142 to rotate the gear 130 in a rotation direction $\phi$.

FIGS. 5a-5g shows the movement of the fixing device of the embodiment of the invention, wherein the sucker 110 is omitted to clarify the description.

Figure 5A:
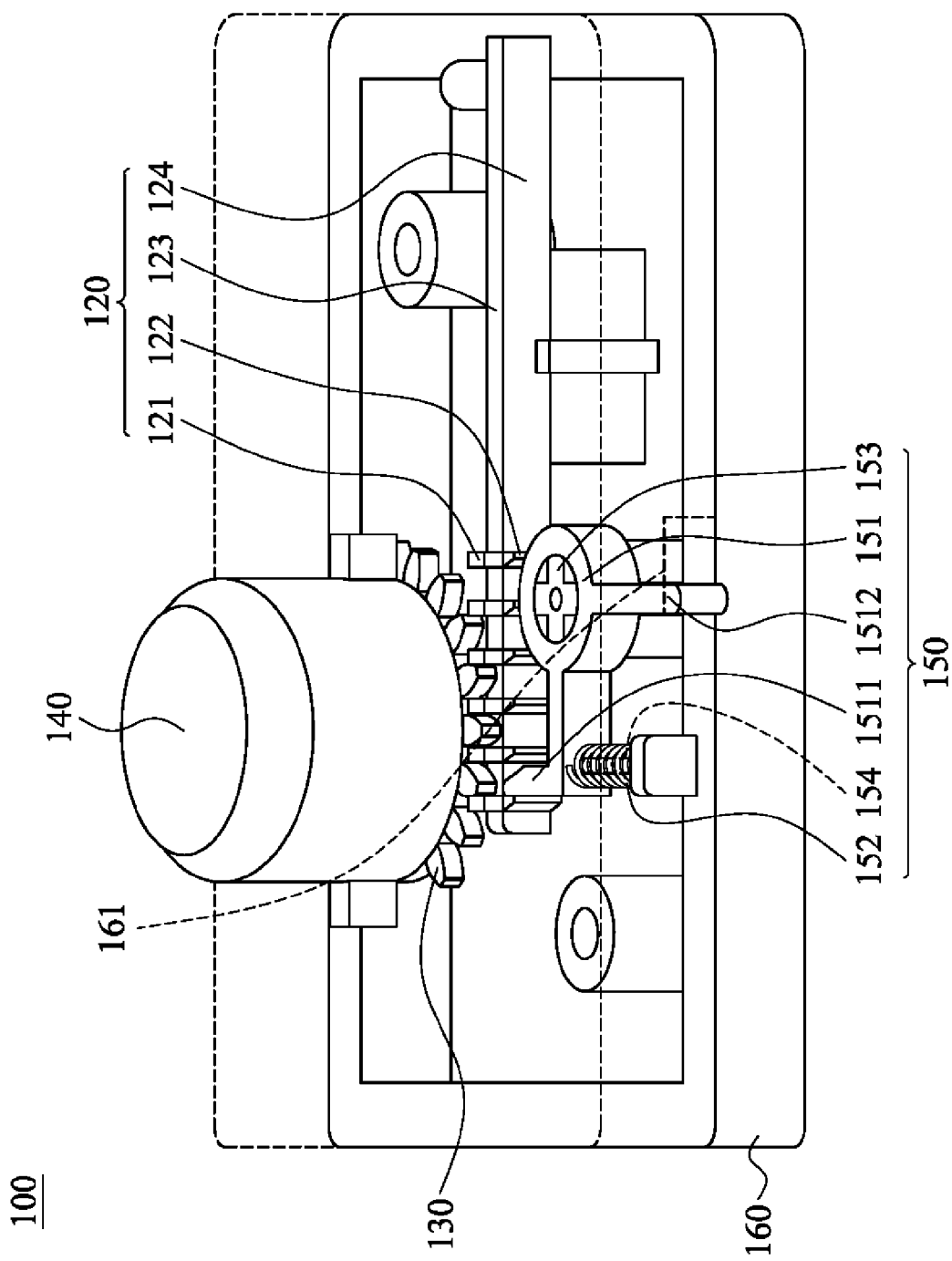
FIGS. 5a-5g shows the movement of the fixing device of the embodiment of the invention.
Figure 5B:
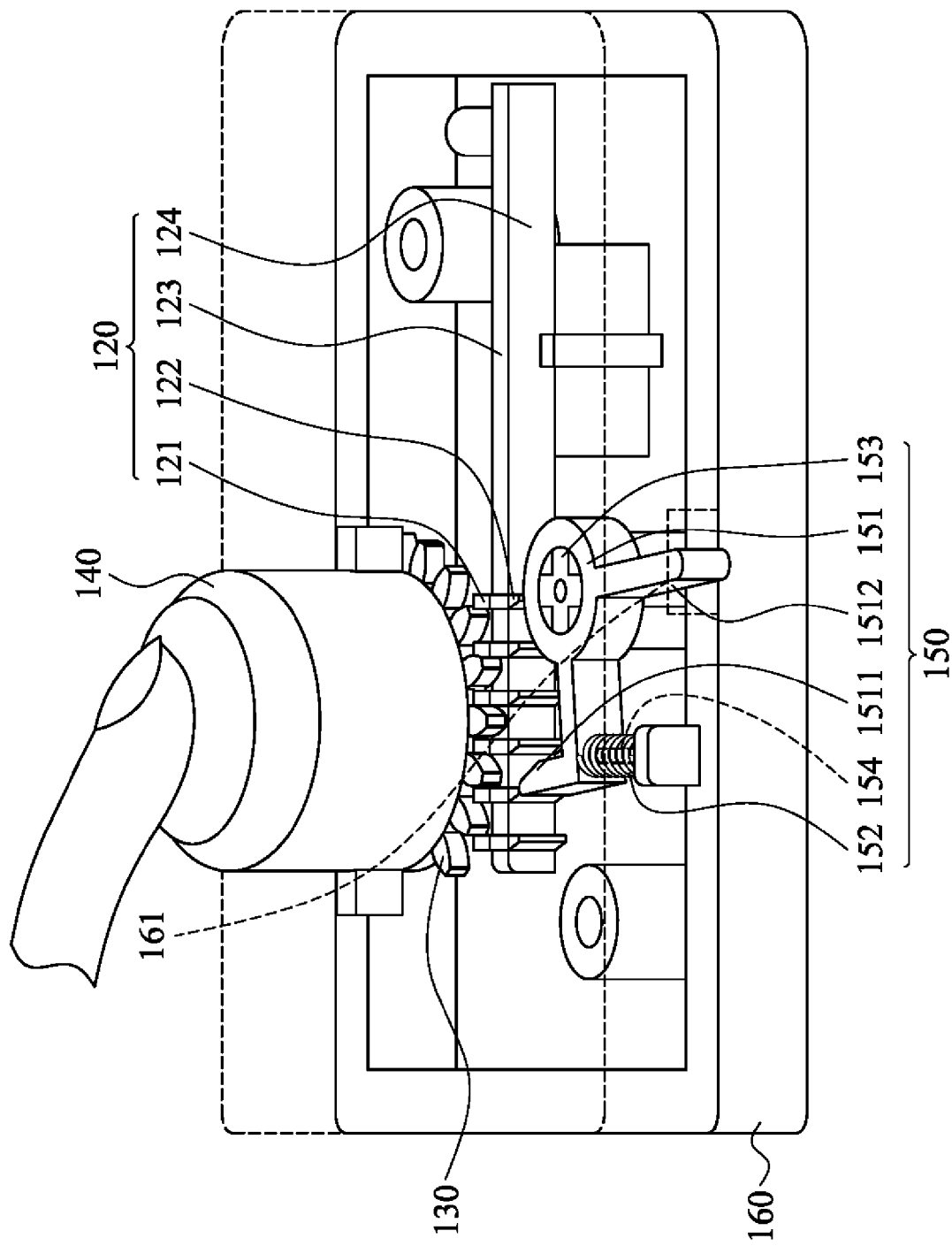
Figure 5C:
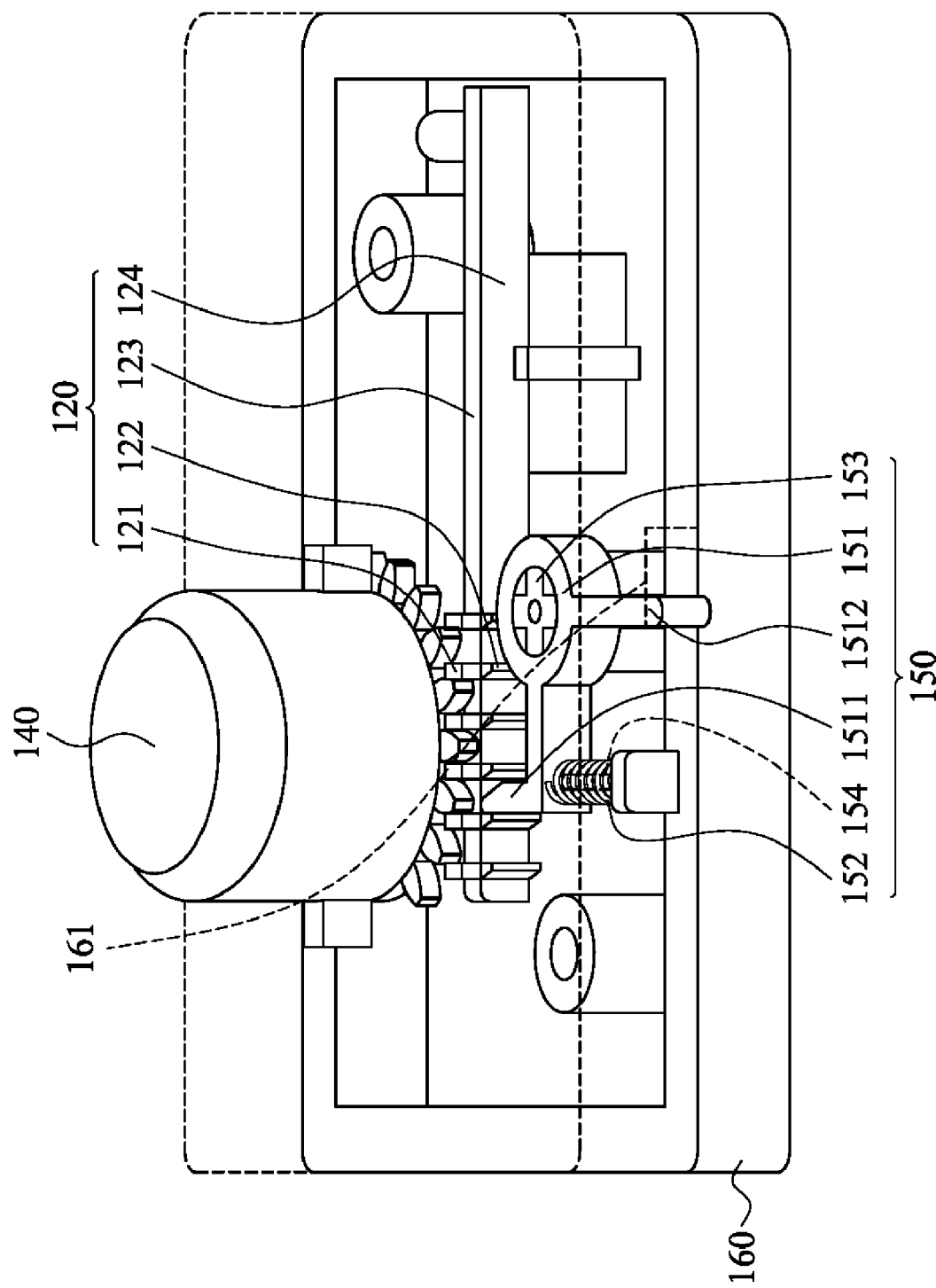

With reference to FIG. 5a, when the sucker 110 is detached from the surface, the rack 120 is in the second position, and the limiting rod 151 is in a first orientation. Next, with reference to FIG. 5b, after the push-button 141 is pressed, the transforming unit 140 rotates the gear 130 to move the rack 120. At this time, the first end 1511 of the limiting rod 151 slides along a bevel edge of the second tooth 122, and the limiting rod 151 is rotated to a second orientation allowing the rack 120 to move relative to the second end 1511. Then, with reference to FIG. 5c, the elastic element 152 pushes the limiting rod 151 back to the first orientation, the first end 1511 of the limiting rod 151 abuts to the second tooth 122, and the second end 1512 of the limiting rod 151 abuts the inner wall of the opening 161 to restrict the rack in a stable position. With the embodiment of the invention, the user attaches the sucker 110 to the surface 101 gradually via pressing the push-button 141.

Figure 5D:
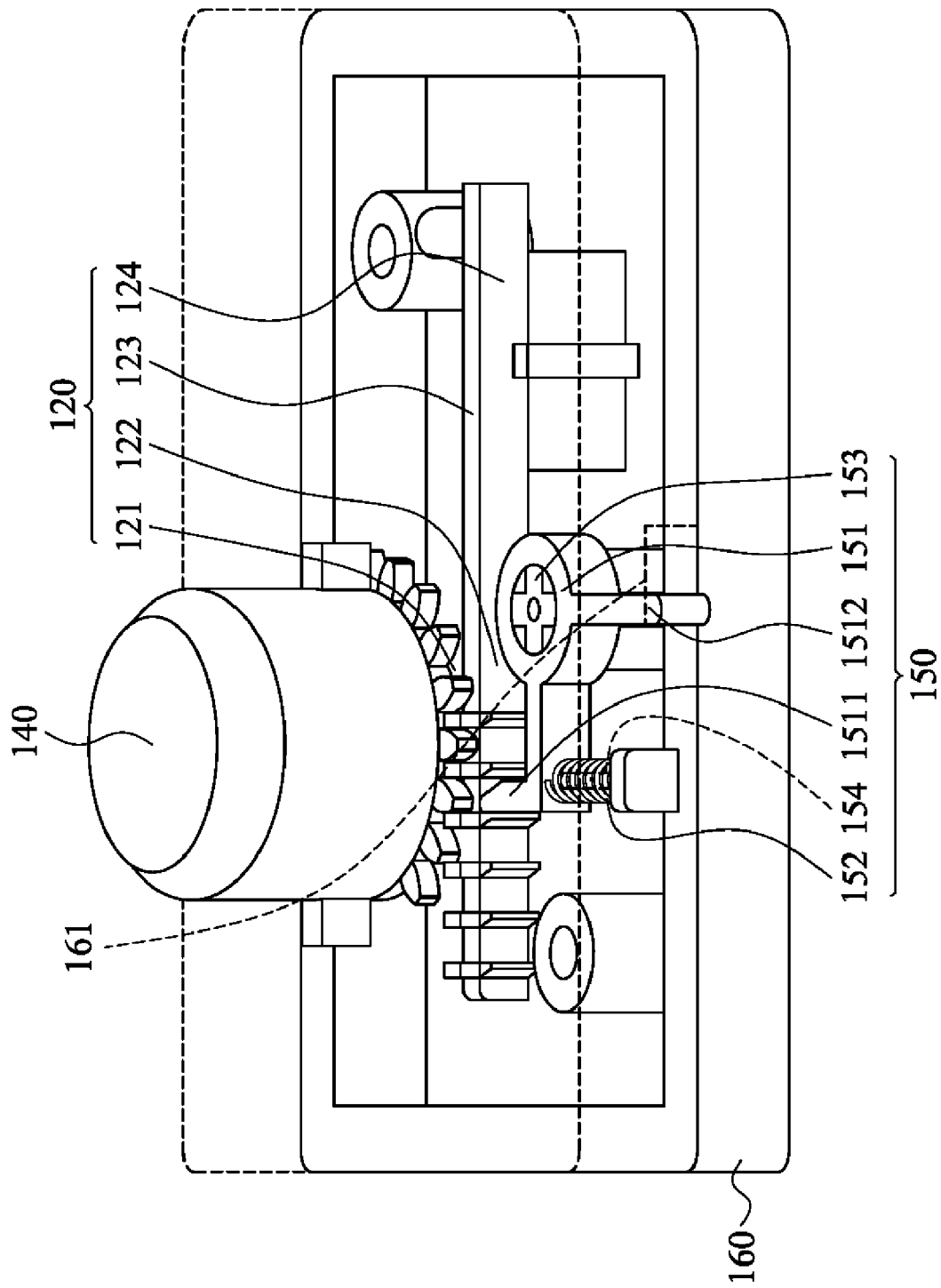
Figure 5E:
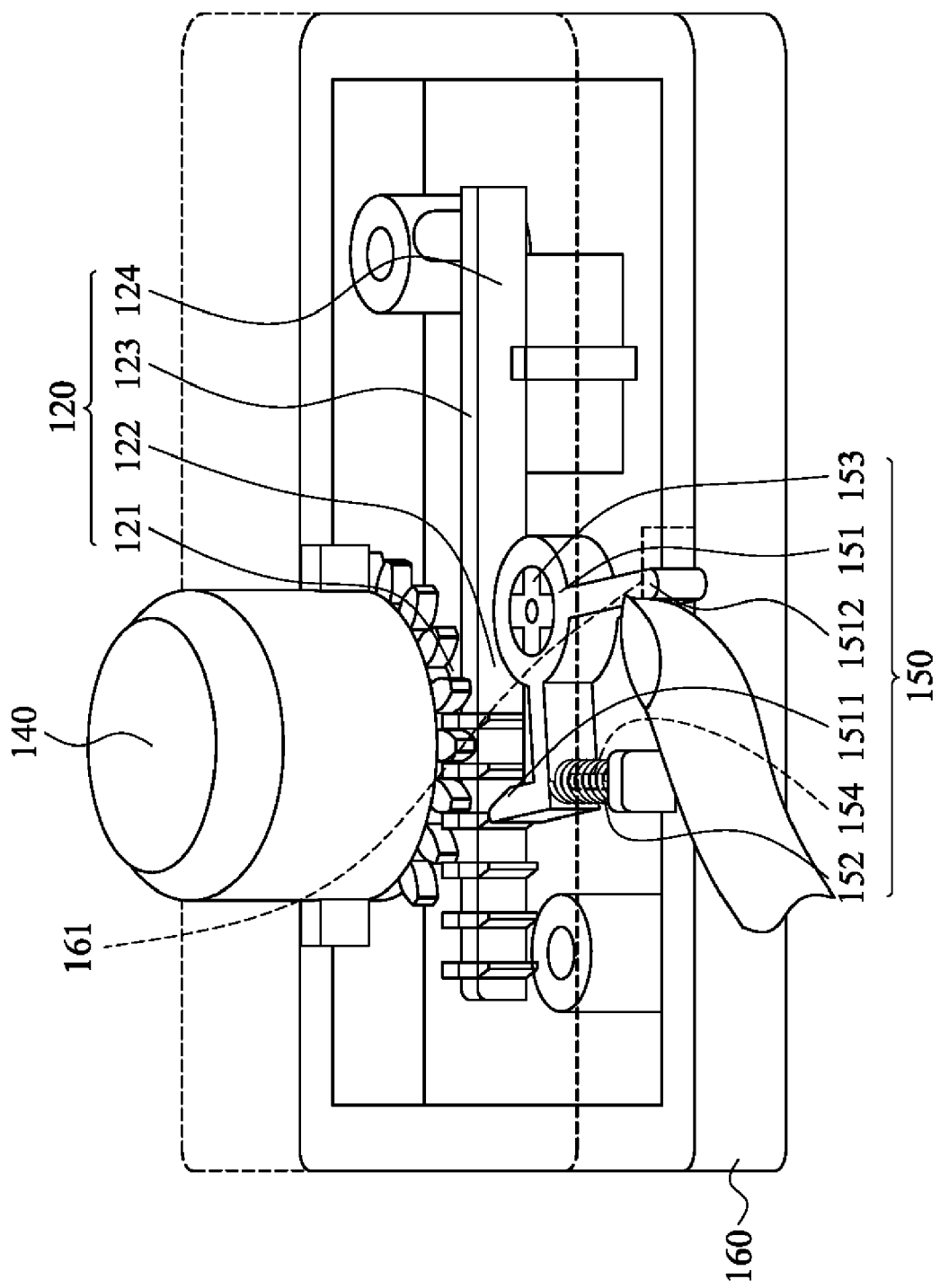
Figure 5F:
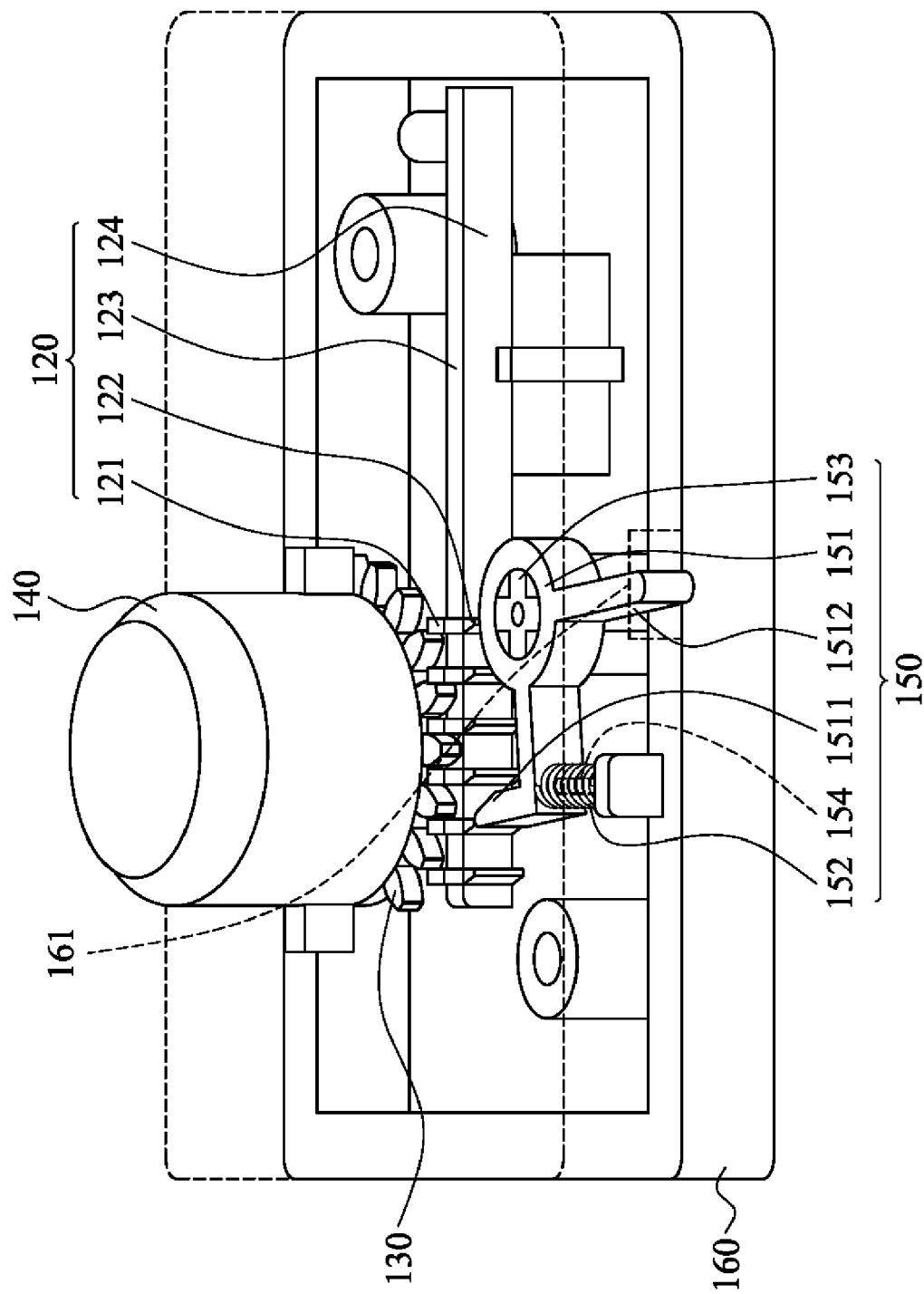
Figure 5G:
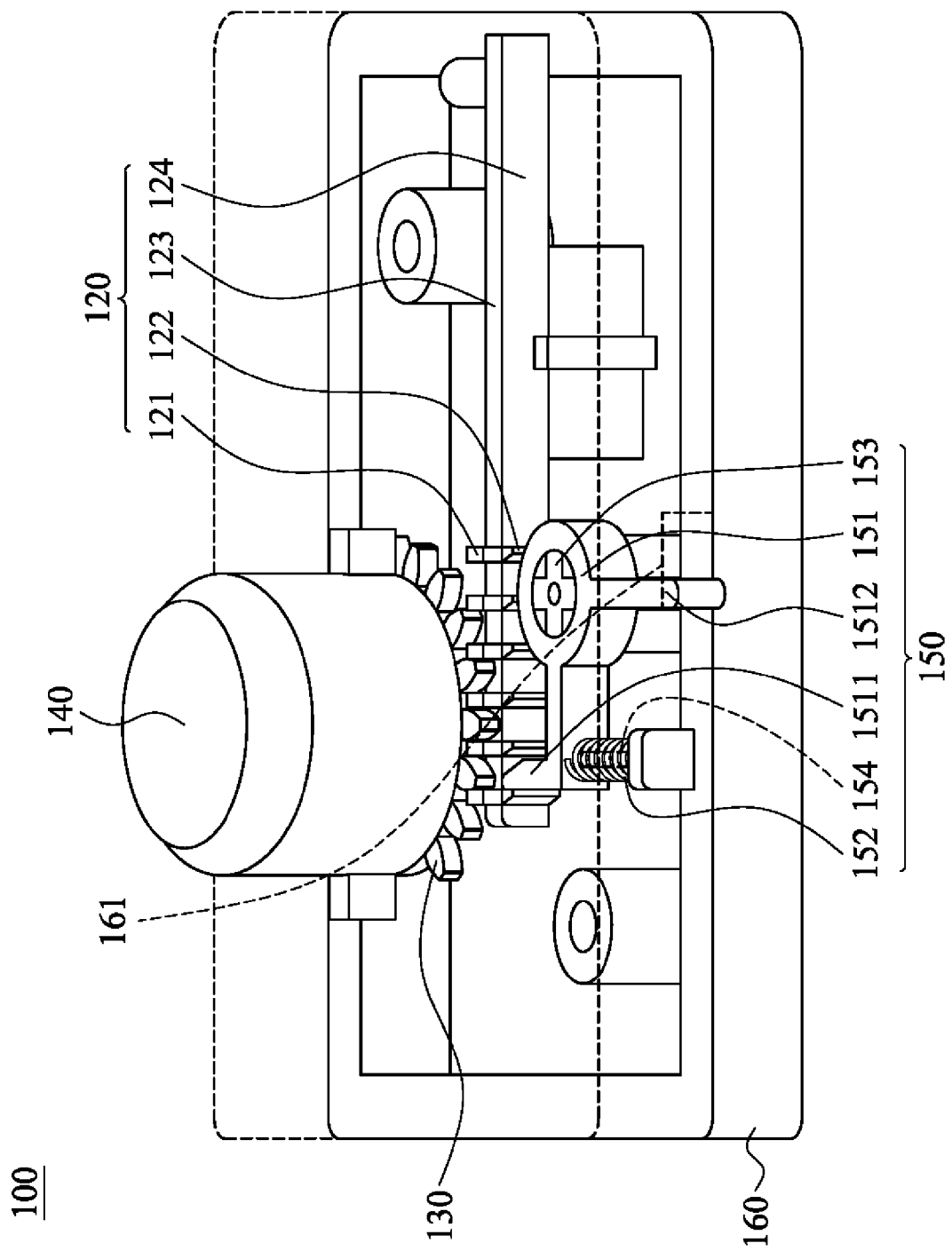

With reference to FIG. 5d, when the sucker 110 is sufficiently attached to the surface, the rack 120 is in the first position, and the limiting rod 151 is in the first orientation. With reference to FIG. 5e, when the fixing device 100 is desired to be detached from the surface 101, the second end 1512 is pushed to rotate the limiting rod 151 to the second orientation, and the first end 1511 leaves the second tooth 122 to release the rack 120. With reference to FIG. 5f, the rack 120 is pushed back to the second position by the elastic force of the sucker 110. Next, with reference to FIG. 5g, the elastic element 152 pushes the limiting rod 151 back to the first orientation, the first end 1511 of the limiting rod 151 abuts the second teeth 122, and the second end 1512 of the limiting rod 151 abuts the inner wall of the opening 151 to restrict the rack 120 in the second position.

Utilizing the embodiment of the invention, a user attaches the sucker to the surface gradually via pressing the push-button. Compared to conventional art, the action of attaching the sucker to the surface of the embodiment can be accomplished with decreased force.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fixing device, fixed to a surface, comprising:
a sucker;
a rack, connected to the sucker;
a gear, engaged to the rack;
a transforming unit, connected to the gear, wherein the transforming unit rotates the gear to move the rack between a first position and a second position, and wherein the rack pushes the sucker to apply a suction force to the surface when the rack is in the first position, and the suction force of the sucker is released when the rack is in the second position; and
a limiting unit, connected to the rack to restrict the rack, wherein the rack comprises a plurality of first teeth and a plurality of second teeth, the first teeth engage the gear, and the second teeth engage the limiting unit, and wherein the rack comprises a first rack surface and a second rack surface, the first rack surface is perpendicular to the second rack surface, the first teeth are formed on the first rack surface, and the second teeth are formed on the second rack surface.

2. The fixing device as claimed in claim 1, wherein the limiting unit comprises a limiting rod and an elastic element, the limiting rod comprises a first end and a second end, when the limiting unit restricts the rack, the first end abuts the second tooth, the second end abuts a housing, and the elastic element contacts the limiting rod to push the first end abutting the second tooth.

3. The fixing device as claimed in claim 2, wherein the limiting unit further comprises a shaft, the limiting rod pivots on the shaft, and the limiting rod is in a first orientation when the limiting unit restricts the rack.

4. The fixing device as claimed in claim 3, wherein when the limiting rod is rotated to a second orientation, the first end leaves the second tooth to release the rack.

5. The fixing device as claimed in claim 2, wherein the elastic element is a compression spring, the limiting unit further comprises a post, the compression spring is telescoped on the post, and the post is disposed in the housing.

6. The fixing device as claimed in claim 1, wherein the transforming unit comprises a push-button and a first tilt slideway, the gear comprises a second tilt slideway, the first tilt slideway is formed in the push-button, the second tilt slideway is formed on the gear, the first tilt slideway contacts the second slideway, and the second tilt slideway slides relative to the first tilt slideway to rotate the gear when the push-button is pressed.

7. The fixing device as claimed in claim 1, wherein the limiting unit comprises a limiting rod and an elastic element, the limiting rod comprises a first end and a second end, and when the limiting unit restricts the rack, the first end abuts the rack, the second end abuts a housing, and the elastic element contacts the limiting rod to push the first end abutting rack.

8. The fixing device as claimed in claim 7, wherein the limiting unit further comprises a shaft, the limiting rod pivots on the shaft, and the limiting rod is in a first orientation when the limiting unit restricts the rack.

9. The fixing device as claimed in claim 8, wherein when the limiting rod is rotated to a second orientation, the first end leaves and releases the rack.

10. The fixing device as claimed in claim 7, wherein the elastic element is a compression spring, the limiting unit further comprises a post, the compression spring is telescoped on the post, and the post is disposed in the housing.

11. A fixing device, fixed to a surface, comprising:
a sucker;
a rack, connected to the sucker;
a gear, engaged to the rack;
a transforming unit, connected to the gear, wherein the transforming unit rotates the gear to move the rack between a first position and a second position, and wherein the rack pushes the sucker to apply a suction force to the surface when the rack is in the first position, and the suction force of the sucker is released when the rack is in the second position; and
a limiting unit, connected to the rack to restrict the rack, wherein the transforming unit comprises a push-button and a first tilt slideway, the gear comprises a second tilt slideway, the first tilt slideway is formed in the push-button, the second tilt slideway is formed on the gear, the first tilt slideway contacts the second slideway, and the second tilt slideway slides relative to the first tilt slideway to rotate the gear when the push-button is pressed.

12. A fixing device, fixed to a surface, comprising:
a sucker;
a rack, connected to the sucker;
a gear, engaged to the rack;
a transforming unit, connected to the gear, wherein the transforming unit rotates the gear to move the rack between a first position and a second position, the transforming unit comprises a push-button;
when the push-button is pressed, the transforming unit drivers the gear to move the rack from the second position to the first position and the sucker attach to a surface.

* * * * *